United States Patent [19]

Beveridge

[11] 4,040,505
[45] Aug. 9, 1977

[54] LUBRICATION SYSTEM FOR EARTH MOVING EQUIPMENT

[75] Inventor: Thomas Anthony Beveridge, Rochester, Ill.

[73] Assignee: Fiat-Allis Construction Machinery, Inc., Deerfield, Ill.

[21] Appl. No.: 626,650

[22] Filed: Oct. 29, 1975

[51] Int. Cl.² .......................................... F01M 11/00
[52] U.S. Cl. ................................................ 184/6.28
[58] Field of Search ............... 184/6.12, 6, 6.13, 6.2, 184/6.28, 6.24

[56] References Cited

U.S. PATENT DOCUMENTS

| | | | |
|---|---|---|---|
| 1,228,558 | 6/1917 | Huff | 184/6.24 |
| 1,764,078 | 6/1930 | Horning | 184/6.24 |
| 2,922,493 | 1/1960 | Hulten | 184/6.28 |
| 3,087,582 | 4/1963 | Potter | 184/6.24 |
| 3,223,197 | 12/1965 | Conover | 184/6.28 |
| 3,767,014 | 10/1973 | Drone | 184/6.12 |
| 3,851,731 | 12/1974 | Jorgensen | 184/6.12 |
| 3,854,553 | 12/1974 | Miller | 184/6.12 |
| 3,857,461 | 12/1974 | Schmitt | 184/6.2 |

FOREIGN PATENT DOCUMENTS

| | | | |
|---|---|---|---|
| 459,328 | 5/1928 | Germany | 184/6.24 |

*Primary Examiner*—Samuel Feinberg
*Attorney, Agent, or Firm*—Jacque L. Meister; Robert A. Brown

[57] ABSTRACT

A lubrication pump and filter are mounted to an access cover for the final drive of earthmoving equipment together with necessary interconnecting lubricant lines. The pump and the filter can both be removed from the access cover without removing the other and without removing the cover. Both the pump, filter and lines affixed to the access cover can be removed or installed as a unit.

1 Claim, 3 Drawing Figures

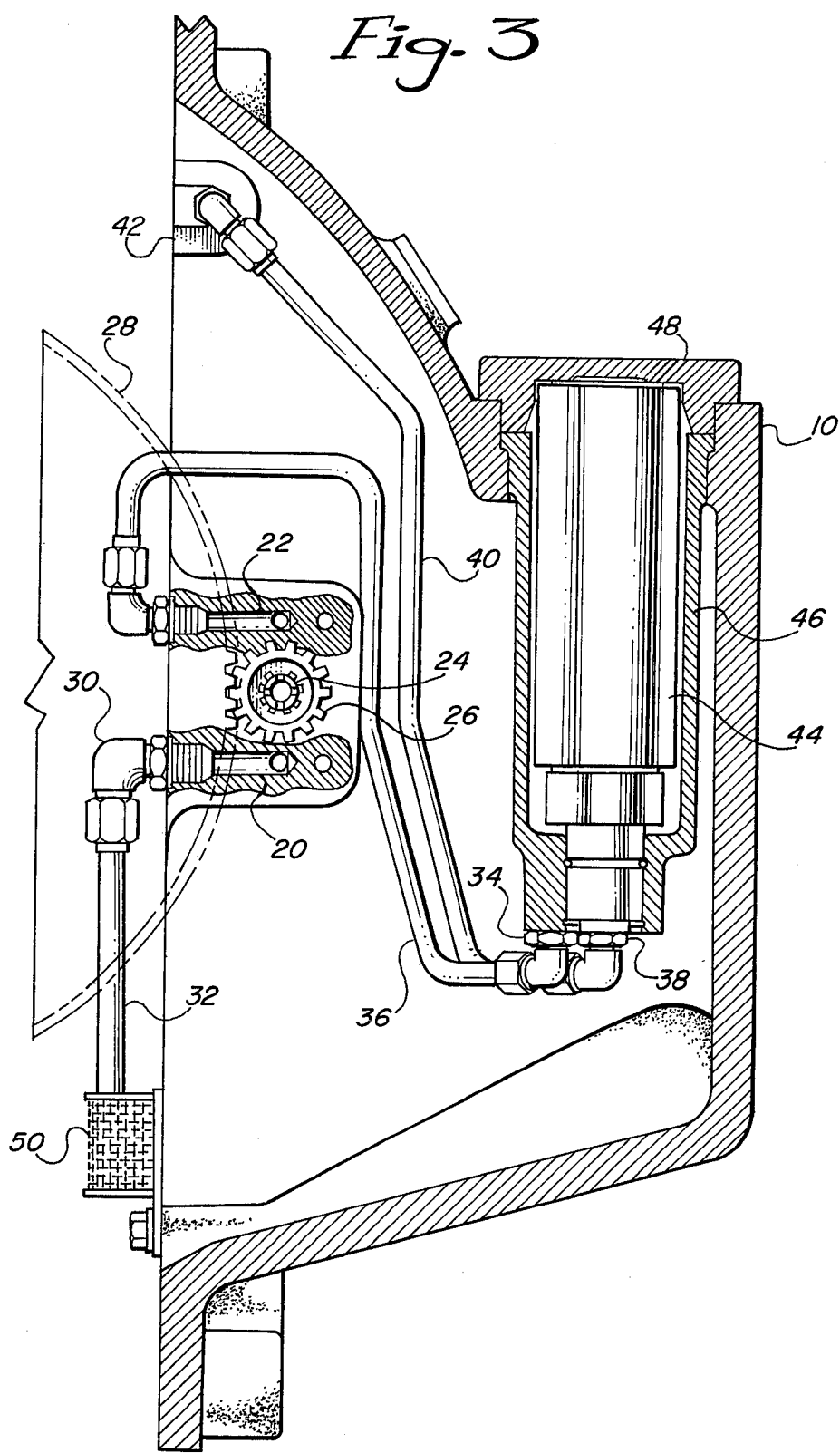

LUBRICATION SYSTEM FOR EARTH MOVING EQUIPMENT

BACKGROUND OF THE INVENTION

This invention relates to a lubrication system for the final drive of a crawler tractor or other earthmoving equipment and more particularly to a lubrication system including pump, filter and connecting conduits self-contained in the cover for the final drive.

Because of the heavy stresses and often hostile physical environment in which crawler tractors or other earthmoving equipment operate, their lubrication systems have been extensively developed to maintain the continuous flow of clean lubricants to their working components. This is especially true for their final drive systems, which typically incorporate a vehicle powered pressure lubrication pump or pumps and which often incorporate a filter in the system to remove dirt from the lubricants. In the majority of such systems the lubrication pump is mounted inside of the final drive housing since it is driven by the vehicle's sprocket drive. Among the most recent of such systems are those disclosed in U.S. Pat. Nos. 3,767,014 and 3,857,461.

While the prior art lubrication systems have proved effective they have been expensive to install and, because of their location inside the final drive housing, inaccessable and difficult to service.

SUMMARY OF THE INVENTION

Accordingly, it is an object of the invention to provide a new and improved pressure lubrication system for earthmoving equipment. It is a further object of the invention to provide a new and improved pressure lubrication system for earthmoving equipment that is less expensive than those of the prior art and yet has increased reliability.

Yet another object of the invention is to provide a pressure lubrication system for earthmoving equipment that is easier to maintain than the prior art systems.

The foregoing and other objects of the invention are achieved by a novel pressure lubrication system embodied in a pump drive assembly incorporated on an access cover for the equipments' final drive. This pump drive assembly incorporates the pressure lubrication pump, filter assembly, check valves and necessary interconnecting plumbing so that the entire assembly can be installed as a unit on the final drive assembly to which it mechanically couples in the assembled position in such a fashion that the pump is operated concurrent with operation of the final drive to supply clean lubricant to the various lubrication point fittings of the final drive. The nature of the invention and its several features and objects will more readily be apparent from the following description of certain preferred embodiments thereof taken in conjunction with the accompanying drawings although variations and modifications may be effected without departing from the spirit and scope of the novel concepts of the disclosure.

DESCRIPTION OF THE DRAWINGS

FIG. 3 is a section of the pump drive assembly taken at 3 — 3 in FIG. 1.

DESCRIPTION OF THE PREFERRED EMBODIMENTS

Figure 1:
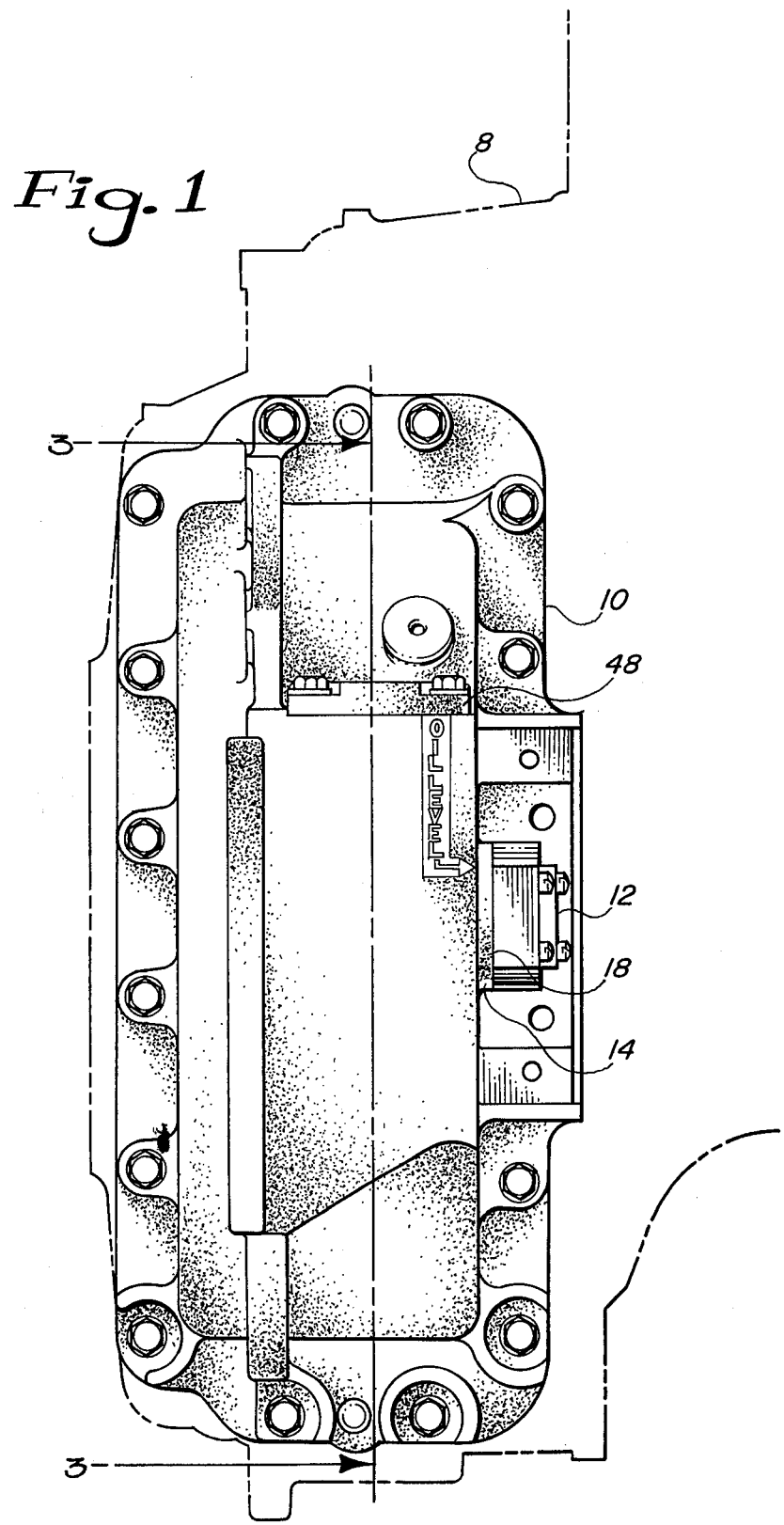
FIG. 1 is a rear view of the final drive of earthmoving equipment showing the novel pump drive assembly of the invention.
Figure 2:
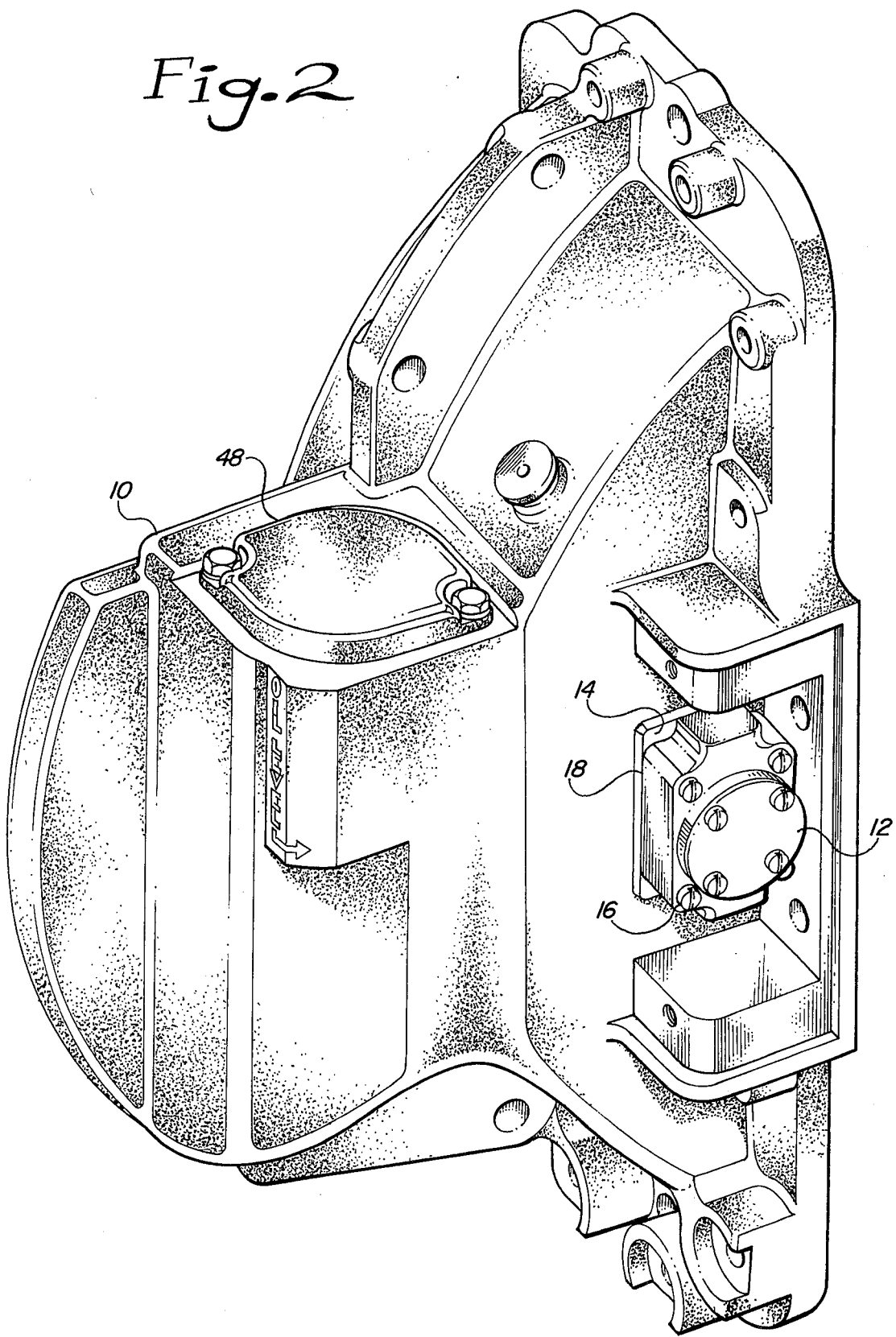
FIG. 2 is a perspective view of the pump drive assembly of the invention.

The drawings illustrate the principal components of the pressure lubrication system of the invention. As there shown, the principal components of the lubrication system are assembled to the exterior of cover 10 of the equipments' final drive, which is itself shown in phantom outline at 8. The exterior of cover 10 is defined as those surfaces that are exterior when the cover is mounted to the final drive and, in the drawing, is the convex surface. The opposite surface is the interior.

Lubrication pump 12 is secured to a boss 14 on cover 10 by any suitable fasteners shown as screws 16. Pump 12 as shown is a rotary gear driven pump with inlet and outlet ports on the pump mounting face 18 in contact with boss 14. The inlet and outlet ports are aligned with drilled passageways 20 and 22 in boss 14 which passageways are best shown in FIG. 3. Both the inlet and outlet ports are gasketed in any conventional fashion, as for example, "O" rings, to prevent leakage between the pump and the boss.

The rotor 24 of pump 12 extends interior of cover 10 and has a drive pinion gear 26 secured to it. Gear 26 meshes with a ring gear 28 shown in phantom in FIG. 3. Ring gear 28 is driven concurrently with the final drive 8 of the earthmoving equipment. Thus, whenever the final drive is operating, ring gear 28 is rotating pump drive pinion 26 and with it the rotor of pump 12 to effect circulation of lubricants to the lubrication points. It is a feature of the invention that because of this manner of mounting and driving the pump 12, it can either be removed from the cover 10 from its exterior or removed with the cover, thus simplifying pump maintenance and service.

Connected to pump inlet passageway 20 is a right angle fitting 30 and lubricant inlet line 32. Line 32 extends to inlet screen 50 also secured to cover 10. Thus, when cover 10 is assembled to the final drive 8, the inlet line 32 and screen 50 are in the sump-lubricant reservoir of the final drive. Connected between pump outlet passageway 22 and filter inlet 34 is filter inlet line 36 with its associated fittings. Connected between filter outlet 38 and lubricant outlet coupling 42 is filter outlet line 40. Filter 44 which may be any of several commercially available units, is advantageously mounted in filter housing 46 and is sealed in the housing by filter cover 48. The details of filter housing 46 with its check valves to insure proper lubricant flow and pressure are now shown since they are not a part of the invention. It is, however, a feature of the invention that because of the illustrated and described construction, filter 44 can be removed from the cover 10 from its exterior for maintenance or replacement.

From the foregoing description, it can be seen that the invention is well adapted to attain all of the ends and objects set forth together with other advantages which are inherent to the apparatus. In particular it can be seen that both the pump and filter are collectively removable from the drive housing by removal of the cover 10 and, either the pump 12 or the filter 44 can be removed from the cover without any need to remove the other or the cover itself. Further, since cover 10 is smaller in size than the housing of final drive 8, it is inherently less difficult to machine and hence, is less expensive than if the final drive housing were machined to permit installation of the lubrication system components.

The detailed description of the invention herein has been with respect to the preferred embodiments thereof. However, it will be understood that variations and modifications can be effected within the spirit and scope of the invention as described herein above and as defined in the appended claims.

What is claimed is:

1. A lubrication system for earthmoving equipment of the type having a final drive enclosed in a closed housing which forms a lubricant sump and has lubricant lines interior thereof for directing lubricant to lubrication points, said closed housing having an access opening located on a side thereof above the level of the lubricant in said sump, said final drive including a lubricant pump drive gear means operable with said final drive and aligned with said access opening, comprising removable access cover means for sealingly closing said access opening, lubricant pump means assessmbled and secured to the exterior of said access cover means and adapted to be removed from said access cover means without removing said cover means from said access opening and being removable, with said cover, filter means assembled in said access cover means so as to be removable from the exterior thereof without removing said cover means from said access opening and being removable with said cover, lubricant line means comprising inlet line means, pump inlet line means, pump and filter interconnecting line means and discharge line means, said inlet line means depending downward from the interior of cover-means and terminating in an inlet screen means below the level of the lubricant in said sump, said pump inlet line means being assembled and secured to the interior of said cover means and connecting said inlet line means to the inlet port of said lubricant pump means, said interconnecting line means being secured to the interior of said cover means between the inlet of said filter means and the outlet port of said lubricant pump means, said discharge line means being assembled and secured to the interior of said cover means and connecting the outlet of said filter means to discharge coupling means whereby when said access cover means is assembled to said access opening said lubricant pump means is connected at its inlet to said lubricant sump, the inlet of said filter means being connected to the output of said lubricant pump means and the outlet of said filter means is connected through said discharge coupling means to said lubrication points, and drive means for connecting said lubricant pump means to said lubricant pump drive gear means, whereby each time said drive means is operated said lubricant pump means withdraws lubricant from said lubricant sump and directs it through said lubricant lines means and said filter means to said lubrication points.

* * * * *